Figure 1:
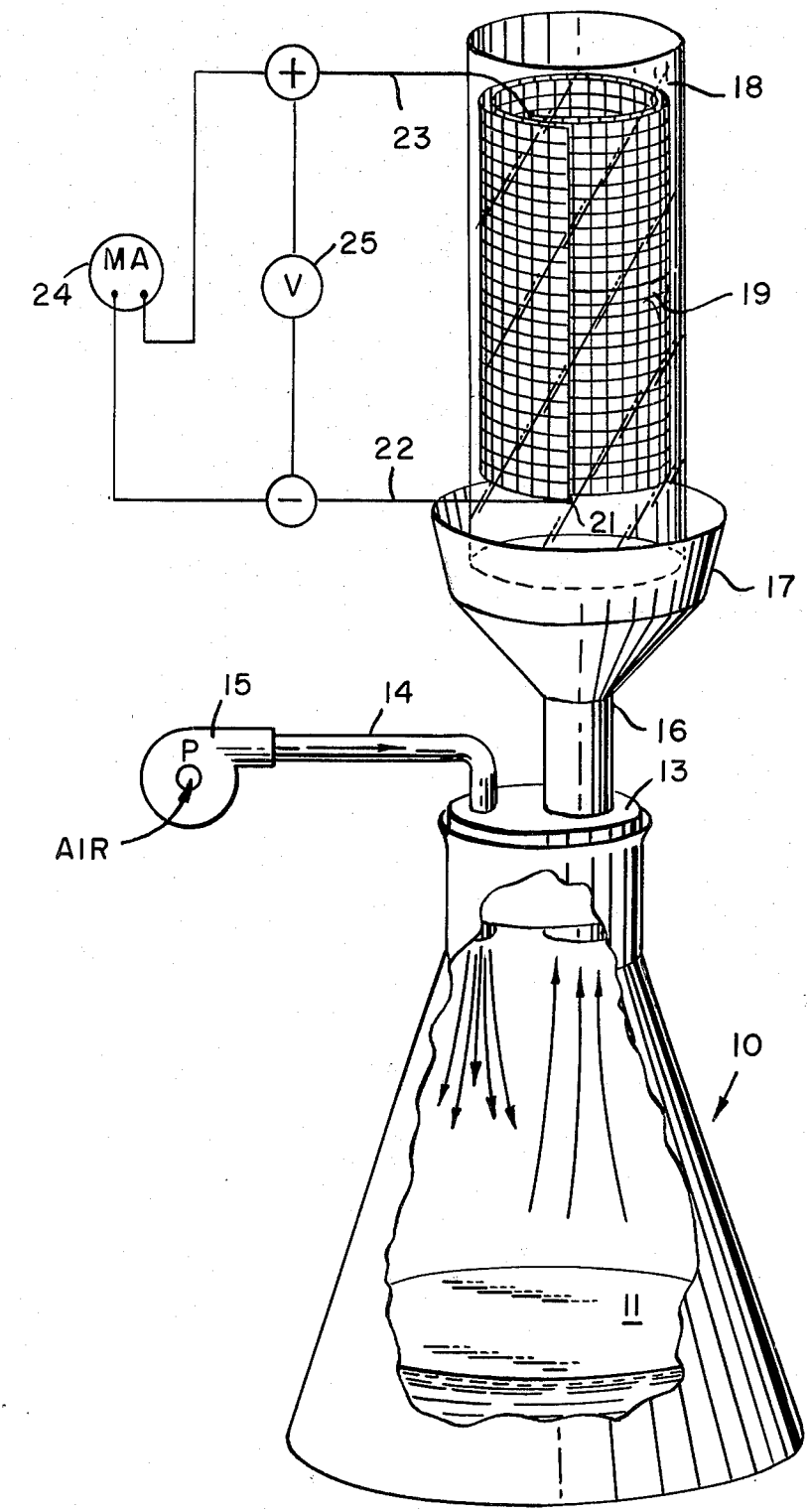

United States Patent [19]
Davis

[11] 3,926,558
[45] Dec. 16, 1975

[54] METHOD FOR MEASURING CONVERSION EFFICIENCY OF CATALYSTS

[76] Inventor: Robert E. Davis, 125 Hillside, Hinsdale, Ill. 60521

[22] Filed: July 5, 1973

[21] Appl. No.: 376,371

[52] U.S. Cl. ........... 23/230 R; 23/232 E; 23/254 E; 23/253 R; 204/1 T; 204/195 R; 136/86
[51] Int. Cl.² .................. G01N 31/10; G01N 31/12; G01N 33/22; H01M 8/22
[58] Field of Search. 136/86 E, 86 R, 86 D, 86 DD; 23/230 R, 253 R, 232 E, 254 E

[56] References Cited
UNITED STATES PATENTS

| | | | |
|---|---|---|---|
| 3,206,332 | 9/1965 | Juda | 136/86 R |
| 3,206,333 | 9/1965 | Ehrenfeld | 136/86 R |
| 3,237,181 | 2/1966 | Palmer | 23/254 E |
| 3,311,508 | 3/1967 | Biddick et al. | 136/86 D |
| 3,347,635 | 10/1967 | Mckee | 23/232 E |
| 3,458,357 | 7/1969 | Truitt | 136/86 R |
| 3,479,257 | 11/1969 | Shaver | 23/254 E X |
| 3,497,390 | 2/1970 | Greene et al. | 136/86 D |
| 3,564,474 | 2/1971 | Firth et al. | 23/254 E X |
| 3,684,454 | 8/1972 | Martin et al. | 23/232 E X |
| R20,041 | 7/1936 | Stein | 23/232 E |

OTHER PUBLICATIONS

C. W. Hinshelwood, The Structure of Physical Chemistry, Clarendon Press, 1951, p. 287.

Primary Examiner—Robert M. Reese
Attorney, Agent, or Firm—Dawson, Tilton, Fallon & Lungmus

[57] ABSTRACT

The efficiency of a catalyst in converting hydrocarbons to carbon dioxide and water is determined by passing hydrocarbon fumes, mixed with air, over a substrate coated with the catalyst and measuring an electrical potential between two points spaced apart in the direction of gas flow. The magnitude of the electrical potential thus developed is representative of the conversion efficiency of the catalyst for a given fuel mixture and air flow rate.

4 Claims, 2 Drawing Figures

FIG.2
TABLE I

| | 1<br>CATALYST SYSTEM | 2<br>VOLTAGE<br>(MILLIVOLTS) | 3<br>CURRENT<br>(MICROAMPS) | 4<br>KNOWN PER CENT<br>CONVERSION |
|---|---|---|---|---|
| I | CHROME-COBALT-PALLADIUM (A) | 1.6 | 16 | 85.35 |
| II | CHROME-PALLADIUM | 2.8 | 27 | 94.24 |
| III | CHROME-COBALT-PALLADIUM (B) | 2.4 | 23 | 88.59 |

METHOD FOR MEASURING CONVERSION EFFICIENCY OF CATALYSTS

Background and Summary

The present invention relates to testing systems for catalytic converters; and more particularly, it relates to method and apparatus for testing the conversion efficiency of a catalyst system. As used herein, a "catalyst system" refers to a catalytic converter for converting hydrocarbon fumes or gas, mixed with air, to water and carbon dioxide. Such converters are used as portable space heaters in the recreational field, but probably the more important commercial usage for these catalysts is in the conversion of the exhaust fumes from internal combustion engines to suppress noxious emission. More information, if it is desired concerning this latter use may be obtained from my copending application Ser. No. 332,360 entitled "Method of Suppressing Noxious Emission from Internal Engines", filed Feb. 14, 1973, now abandoned. A method of preparing a particular complexed catalyst useful in suppressing noxious emission is disclosed in my copending application Ser. No. 307,652 entitled "Method of Catalyst Preparation for Use in Suppressing Hydrocarbon and Carbon Monoxide Emission from Internal Combustion Engines", filed Nov. 17, 1972, now abandoned.

Currently, the conversion efficiency of catalysts is tested through conventional methods of chemical analysis, after collecting the emission fumes. Such tests are made not only to determine the initial conversion efficiency of a catalyst, but the tests are continuously made over a prolonged period of time to determine the useful life of a catalyst.

I have discovered that by passing a mixture of the hydrocarbon fumes and air over a substrate coated with a catalyst, an electrical potential is developed along the direction of gas flow. The polarity of the resultant potential is negative to positive in the direction of gas flow — that is, the potential is more negative at the location where the gas mixture first impinges upon the coated substrate. This is further surprising in that this is also the hottest location of a catalyst. There is a substantial decrease in temperature along the direction of gas flow because most of the conversion takes place at the front of the coated substrate, so most of the heat is generated there. The resultant polarity is thus the reverse of that which would be expected from the Seebeck or Thompson effects wherein the heating of a metal will produce an electron flow, but the electrons flow away from the source of heat, leaving that location at a relatively positive potential.

I have found that there is an excellent correlation between the magnitude of the potential thus developed and the conversion efficiency of the catalyst system being tested. This was found by correlating the results of my invention with the results of catalytic systems having known conversion efficiencies.

Further, I have discovered that an appreciable and sustained current may be generated while converting hydrocarbons; and the same excellent correlation exists between the conversion efficiency of the catalyst system and the current flowing between the two electrodes contacting the substrate at two locations spaced along the direction of gas flow. Again, the phenomenon is characteristically different from that of a thermocouple which generates a negligible amount of current. Hence, in addition to measuring the conversion efficiency of a catalyst system, the present invention may be used to generate electricity. They may be put to uses similar to those, for example, to which fuel cells are currently employed.

A number of other useful applications can readily be imagined for the phenomenon of the present discovery. For example, a catalytic converter used in an automobile having an internal combustion engine for the reduction of noxious emission could be equipped with two inert electrodes (i.e., points of electrical contact) and a voltmeter, ammeter or light-indicating system. In the case of a voltmeter or ammeter, a portion of the scale could be shaded red, indicating to the driver that the catalytic converter was not operating properly if the potential difference generated at the two electrodes or current flowing between the two electrodes were less than a predetermined amount. Alternatively, a light or other signal would be employed when the potential or current between the two electrodes in the catalytic converter fell below a predetermined level.

Other features and advantages of the present invention will be apparent to persons skilled in the art from the following detailed description of a preferred embodiment accompanied by the attached drawing.

The Drawings

FIG. 1 is a schematic view, partially in perspective and partially in functional form, of an apparatus incorporating the present invention and FIG. 2 is a table showing a comparison of measurements using the present invention with the conversion efficiency of known catalyst systems.

Referring then to the drawing, reference numeral 10 generally designates a container, such as a flask, for storing a quantity of liquid fuel denoted 11. The flask is closed by a stopper 13 provided with two apertures, one of which receives an inlet conduit 14 from a conventional air pump 15. The other aperture in the stopper 13 receives an outlet conduit 16 which is fitted with a funnel-shaped member 17. A glass sleeve or cylinder 18 rests on the funnel-shaped member 18; and it, in turn, supports a screen generally designated 19 which is coated with the catalyst under test. There may be one or more elements (platinum, palladium, etc.) on the substrate.

An electrical connection is made with the lower or input end of the screen 19 as at 21 by means of a first conductor 22 which forms a negative inert electrode, as indicated. The upper or outlet end of the screen 19 is in electrical continuity with a second wire 23. This connection forms a positive inert electrode. The conductors 22, 23 are connected to the terminals of an ammeter represented by the symbol designated 24 and a voltmeter 25. The positioning of the electrodes 22 and 23 is not critical within reason, except that they should be spaced apart in the direction of gas flow over the substrate which is the same as the direction of temperature decrease, as will be more fully explained below. It is felt that better results are achieved if the negative electrode 22 is placed at the approximate location of maximum hydrocarbon conversion (or hottest temperature).

The shape and substance of the screen 19 is also not critical, as various forms have been successfully operated. The form illustrated is a spirally-wound stainless steel screen having a No. 40 mesh forming approximately two complete laps.

Using the apparatus illustrated in the drawing, and a lead-free gasoline for the fuel 11 and a constant flow rate of about 4 cu. ft. per hour, I have tested a number of catalyst systems as indicated in the attached Table I.

In Table I, the first column from the left identifies the three known catalyst systems including: I. Chrome-Cobalt-Palladium (A); II. Chrome-Palladium; and III. Chrome-Cobalt-Palladium (B). The third system has a larger percentage of Palladium than the first. The second column shows the voltage measured at meter 25. The third column shows the current measured at meter 24; and the fourth column shows the known conversions percentage of the respective catalyst systems when used in an automobile catalytic converter of an automobile traveling at 50 miles per hour.

There is a 93 percent correlation between the electrical potential generated between the conductors 22, 23 (column 2) and the known conversion efficiency of the respective catalyst (column 4). There is a 94 percent correlation between the current measured (column 3) and the known conversion efficiency.

It will be appreciated that air from the pump 15 flows through the conduit 14 and mixes with the vaporized gas from the supply 11. The mixture exits through the conduit 16 and then flows upwardly through the tube 18. Because of the spiral shape of the screen substrate 19, the gas mixture flows generally over the screen rather than through it. The greatest rate of conversion takes place at the inlet area of the screen 19, and conversion appears to progressively lessen in the direction of gas flow. Consequently, the temperature at the inlet portion of the screen has been observed to be substantially higher than that at the outlet end. The inlet portion of the stream has been observed to glow with a rather bright light, and the intensity of the light progressively diminishes so that towards the outlet end, the screen retains its normal color. There is a temperature differential of about 600°–700°F. over a length of approximately 6 in. The total unwound length of the mesh is 6 in.; and it is wound into a spiral of about 2 in. diameter.

It will be observed from the data recorded in Table I, that the current generated, as measured by the ammeter 24 is appreciable; and this amount of current can continuously be generated as long as conversion takes place. The voltages indicated in Table I were measured with the ammeter 24 (representing a relatively low load impedance) connected in circuit as illustrated. This demonstrates the generation of a substantial amount of electrical energy.

The mechanism which produces the observed result is not perfectly understood, and I do not intend to in any way limit my invention by this explanation. However, it appears that an oxidation/reduction reaction is taking place with oxidation of the vapor fuel occurring at the inlet end. The fuel vapor thereby loses electrons and these electrons are collected by the catalyst-coated screen at the inlet end. A reduction reaction appears to take place further down the screen, in the direction of gas flow; and the resultant gain of electrons by the gas produces a net positive potential at the outlet end of the screen. It may be that the reactions taking place are described by the following half-reaction equations:

OXIDATION

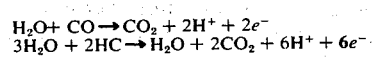

$$H_2O + CO \rightarrow CO_2 + 2H^+ + 2e^-$$
$$3H_2O + 2HC \rightarrow H_2O + 2CO_2 + 6H^+ + 6e^-$$

REDUCTION

$$4e^- + 4H^+ + 2NO_2 \rightarrow N_2 + 4H_2O$$

Having thus described in detail one embodiment of the present invention, persons skilled in the art will be able to modify certain of the structure which has been described and to substitute equivalent elements for those disclosed while continuing to practice the principle of the invention; and it is, therefore, intended that all such modifications and substitutions be covered as they are embraced within the spirit and scope of the appended claims.

I claim:

1. A method of measuring the hydrocarbon conversion efficiency of a catalyst system on a substrate comprising: passing a gaseous hydrocarbon fuel mixture along said catalyst-bearing substrate; and measuring an electrical signal at spaced locations of different temperature on said substrate, said signal being representative of the hydrocarbon conversion efficiency of said catalyst.

2. The method of claim 1 wherein said step of measuring comprises measuring the voltage at said locations spaced in the direction of gas flow.

3. The method of claim 1 wherein said step of measuring comprises measuring the current at said locations spaced in the direction of gas flow.

4. A method of indicating the conversion efficiency of a catalyst system on a substrate for oxidizing a gas containing hydrocarbons and carbon monoxide comprising: passing said gas along said substrate; and measuring an electrical signal between two locations spaced apart on said substrate, said spaced locations being at different temperatures, said signal being a measure of the conversion efficiency of said catalyst.

* * * * *